United States Patent
Puckett et al.

(10) Patent No.: US 11,705,687 B2
(45) Date of Patent: Jul. 18, 2023

(54) CASCADED RESONANT OPTICAL PHASE MODULATORS FOR ENHANCED SENSITIVITY WHILE PRESERVING LINEARITY

(71) Applicant: Honeywell International Inc., Morris Plains, NJ (US)

(72) Inventors: Matthew Wade Puckett, Phoenix, AZ (US); Neil A. Krueger, Saint Paul, MN (US); Steven Tin, Edina, MN (US); Jeffrey James Kriz, Eden Prairie, MN (US)

(73) Assignee: Honeywell International Inc., Charlotte, NC (US)

( * ) Notice: Subject to any disclaimer, the term of this patent is extended or adjusted under 35 U.S.C. 154(b) by 541 days.

(21) Appl. No.: 16/859,471

(22) Filed: Apr. 27, 2020

(65) Prior Publication Data
US 2021/0336405 A1   Oct. 28, 2021

(51) Int. Cl.
*G02F 1/03* (2006.01)
*H01S 3/13* (2006.01)
(Continued)

(52) U.S. Cl.
CPC ............ *H01S 3/1307* (2013.01); *G02F 1/035* (2013.01); *G02F 1/0311* (2013.01);
(Continued)

(58) Field of Classification Search
CPC .... G02F 1/0311; G02F 1/0316; G02F 1/0344; G02F 1/035; G02F 1/0147; G02F 2201/127; G02F 2201/16; G02F 2203/50
See application file for complete search history.

(56) References Cited

U.S. PATENT DOCUMENTS 6,149,789 A  *  11/2000  Benecke ................. B03C 5/005
                                                         204/547
7,054,054 B1 *   5/2006  Srinivasan .......... G02B 26/0825
                                                         359/295
(Continued)

FOREIGN PATENT DOCUMENTS

WO     2019169507 A1    9/2019
WO     2019213137 A1    11/2019

OTHER PUBLICATIONS

Akiyama et al., "Cascaded-ring-resonator-loaded Mach-Zehnder modulator for enhanced modulation efficiency in wide optical bandwidth", Optics Express 16321, Jul. 16, 2012, pp. 1 through 18, vol. 20, No. 15, Optical Society of America.
(Continued)

*Primary Examiner* — Christopher Stanford
*Assistant Examiner* — Journey F Sumlar
(74) *Attorney, Agent, or Firm* — Fogg & Powers LLC

(57) ABSTRACT

An optical phase modulator comprises a cascaded array of optical resonators, wherein each of the optical resonators has an input port and an output port. A plurality of waveguides are coupled between the optical resonators and are configured to provide cascaded optical communication between the optical resonators. Each of the waveguides is respectively coupled between the output port of one optical resonator and the input port of an adjacent optical resonator. A transmission electrode is positioned adjacent to the optical resonators, with the transmission electrode configured to apply a drive voltage across the optical resonators. The optical phase modulator is operative to co-propagate an input optical wave with the drive voltage, such that a resonator-to-resonator optical delay is matched with a resonator-to-resonator electrical delay.

20 Claims, 19 Drawing Sheets

(51) Int. Cl.
*G02F 1/035* (2006.01)
*G02F 1/01* (2006.01)

(52) U.S. Cl.
CPC .......... *G02F 1/0316* (2013.01); *G02F 1/0344* (2013.01); *G02F 1/0147* (2013.01); *G02F 2201/127* (2013.01); *G02F 2201/16* (2013.01); *G02F 2203/50* (2013.01)

(56) References Cited

U.S. PATENT DOCUMENTS

| | | |
|---|---|---|
| 8,483,521 B2 | 7/2013 | Popovic |
| 9,002,147 B2 | 4/2015 | Akiyama |
| 9,178,520 B2 | 11/2015 | Witzens |
| 9,450,673 B2 | 9/2016 | Vahala et al. |
| 9,905,999 B2 | 2/2018 | Li et al. |
| 10,014,649 B2 | 7/2018 | Li et al. |
| 10,050,704 B1 | 8/2018 | Yap |
| 10,454,238 B2 | 10/2019 | Fermann et al. |
| 2009/0231686 A1* | 9/2009 | Atkins ............... G02B 6/12002 385/28 |
| 2009/0284826 A1* | 11/2009 | Langdon ................. G02F 1/116 359/308 |
| 2011/0019955 A1* | 1/2011 | Morton ................... G02F 1/011 385/1 |
| 2015/0132015 A1* | 5/2015 | Hayakawa ............... G02B 6/28 385/2 |
| 2018/0217467 A1* | 8/2018 | Miyazaki ........... H04B 10/5161 |

OTHER PUBLICATIONS

Misra et al., "Nonlinearity- and dispersion-less integrated optical time magnifier based on high-Q SiN microring resonator", Scientific Reports, Oct. 3, 2019, pp. 1 through 11, www.nature.com/scientificreports.

Poulton et al., "Optical Phased Array with Small Spot Size, High Steering Range and Grouped Cascaded Phase Shifters", at least as early as Mar. 30, 2016, pp. 1 through 3.

* cited by examiner

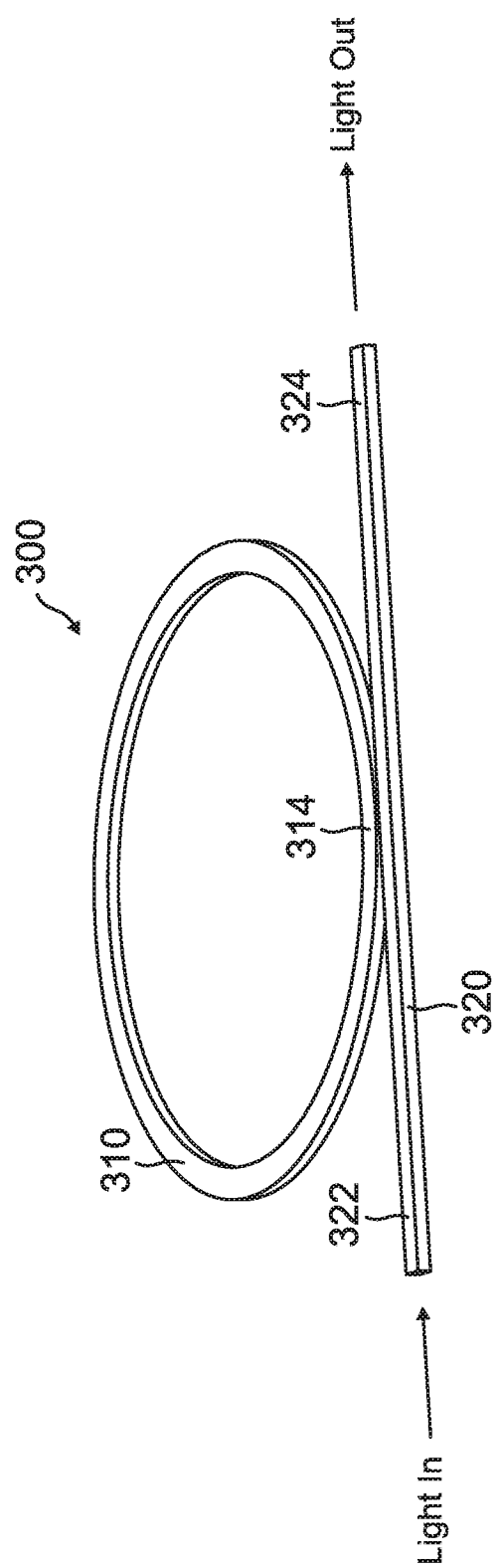

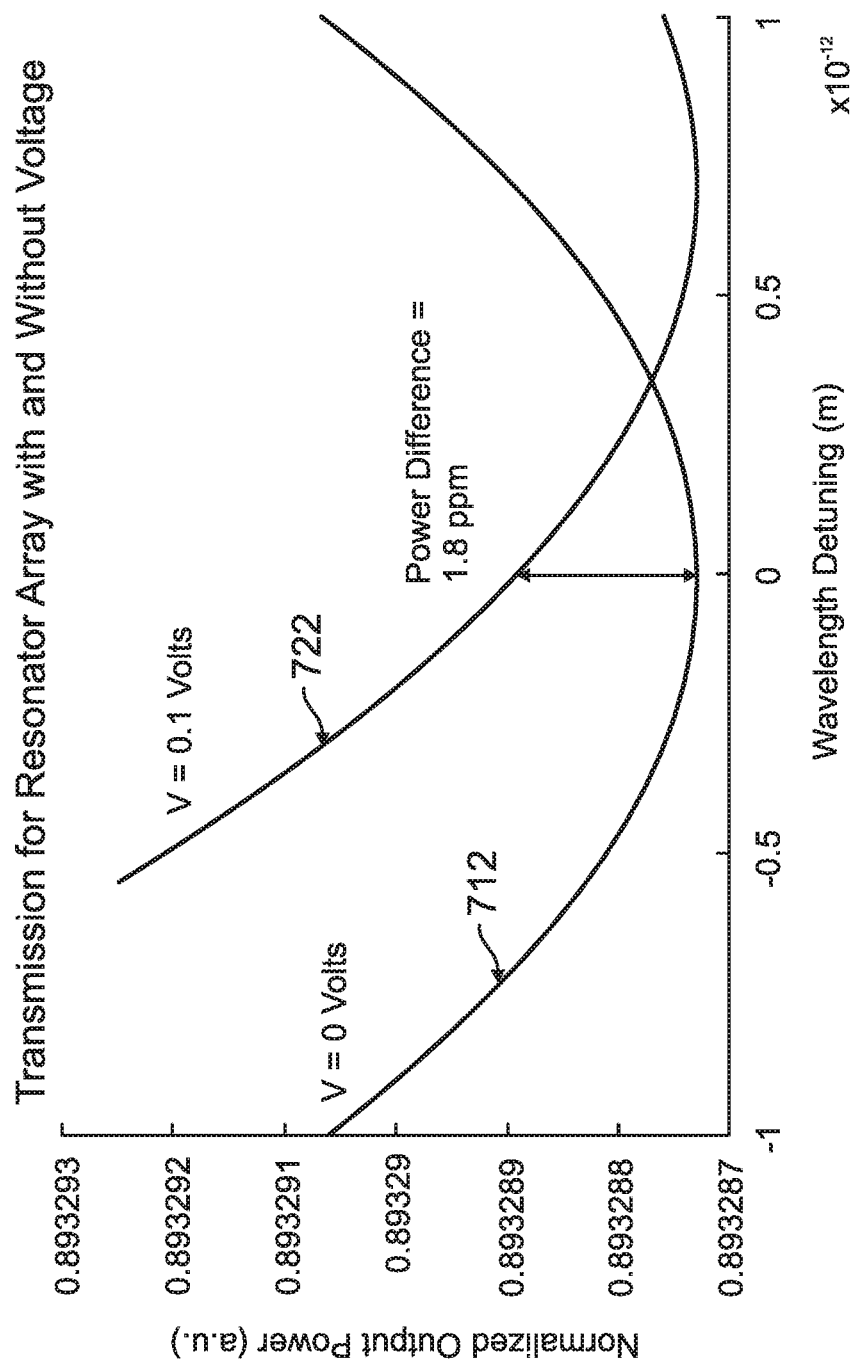

CASCADED RESONANT OPTICAL PHASE MODULATORS FOR ENHANCED SENSITIVITY WHILE PRESERVING LINEARITY

BACKGROUND

Integrated photonics phase modulators are important components of emerging telecommunications networks because they allow data to be encoded in the optical domain, allowing for long distance, low-energy data relays. These same components are also desirable for a wide range of sensing applications in which optical readout is desirable, because phase modulation must often be employed to allow input optical sources to track sensing phenomena.

The current state-of-the-art in on-chip optical phase modulation is a straight waveguide composed of either silicon, silicon nitride, or lithium niobate, typically ranging from several millimeters to one centimeter in length. A conventional phase modulator with a straight waveguide optical path is poorly suited to low-energy modulation because of how weak the electro-optic effect is, per unit length.

A phase modulator with a single optical resonator is poorly suited to high-bandwidth modulation because of the large optical response time, which translates to low bandwidth. Phase modulators which simultaneously exhibit high linearity and low drive voltage are difficult to produce, and the benefits which can be offered by employing resonant modulators are often eclipsed by the accompanying reduction in operational bandwidth.

SUMMARY

An optical phase modulator comprises a cascaded array of optical resonators, wherein each of the optical resonators has an input port and an output port. A plurality of waveguides are coupled between the optical resonators and are configured to provide cascaded optical communication between the optical resonators. Each of the waveguides is respectively coupled between the output port of one optical resonator and the input port of an adjacent optical resonator. A transmission electrode is positioned adjacent to the optical resonators, with the transmission electrode configured to apply a drive voltage across the optical resonators. The optical phase modulator is operative to co-propagate an input optical wave with the drive voltage, such that a resonator-to-resonator optical delay is matched with a resonator-to-resonator electrical delay.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 3 is an enlarged schematic perspective view of a ring-based optical resonator for an optical phase modulator, according to another embodiment;

FIG. 7B is a graph of the transmission spectrum for the resonator array with and without the applied voltage;

DETAILED DESCRIPTION

Figure 1:
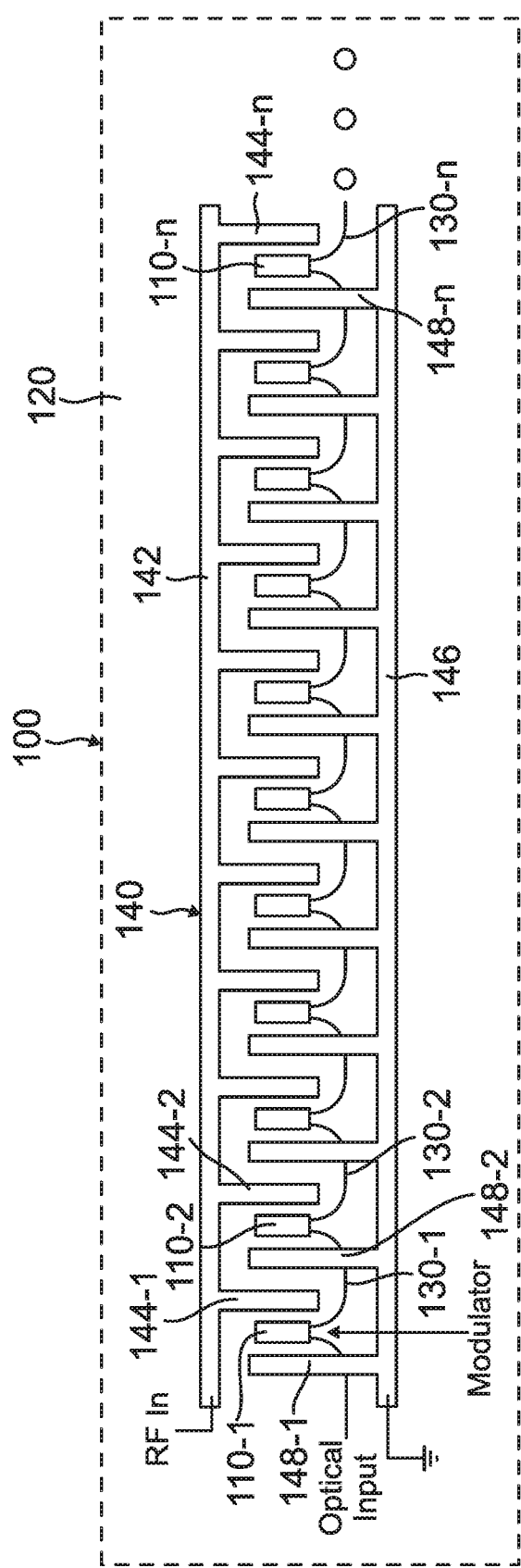
FIG. 1 is a schematic diagram of an optical phase modulator, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Various cascaded resonant optical phase modulators are described herein, which provide for enhanced sensitivity while preserving linearity.

The present approach provides a method for maintaining the drive voltage and spatial footprint reduction benefits of optical resonators for phase modulation without making drastic concessions in terms of the bandwidth of the device. Instead of using a straight waveguide for modulation, an array of cascaded resonators, with either gradually varying resonance frequencies or a constant resonance frequency, are implemented in the optical phase modulators to modulate the phase of an output wave. The cascaded resonator approach benefits over the linear waveguide approach by increasing phase sensitivity to electro-optic or thermo-optic effects. The cascaded resonator approach also benefits over the single resonator approach by increasing linearity and operational bandwidth.

The present optical phase modulators provide for an enhancement in phase sensitivity as compared to state-of-the-art devices on the order of one to two orders of magnitude without reducing operational bandwidth, opening up a new range of applications. For example, the cascaded resonant phase modulators can be implemented in chip-scale light detection and ranging (LIDAR) applications.

In order to produce the cascaded resonant optical phase modulator, a single low-Q phase modulator is designed. This can be done in a number of ways, including by the use of a grating-based resonator such as a Bragg resonator, or a ring resonator. A method to change the resonance wavelength of the resonator is then determined, such as by changing the radius of the ring resonator or the grating period of the Bragg resonator. Once this has been done, an array of resonators is fabricated in which the resonance wavelength is gradually swept across a desired spectral bandwidth greater than or equal to zero Hz. The array of resonators are then arranged such that the resonators are driven by a single travelling wave electrode. The fabrication of the resonators may be done through standard lithographic processes, using any of a wide range of low-index and high-index transparent materials.

To operate the cascaded resonant optical phase modulator, the operational wavelength is positioned within the center of the spectral range of operation, and a voltage difference is applied to the input of the travelling wave electrodes. In order to preserve high bandwidth, the optical delay between the resonators can be matched to the electrical delay between elements in the travelling wave electrodes.

In one embodiment, the electro-optic effect is employed during operation of the optical phase modulator. In this embodiment, the electrodes function to change the refractive index of the resonators, which changes the resonance wavelength of each resonator, inducing a phase change in the transmitted light.

In another embodiment, the thermo-optic effect is employed during operation of the optical phase modulator. In this embodiment, the electrodes function as microheaters, and the local change in temperature within the resonators changes the resonance wavelength of each resonator by the same amount, inducing a phase change in the transmitted light.

Using an array of cascaded low-Q resonators in the optical phase modulator provides the benefit of maintaining high bandwidth and low energy per bit. In addition, sweeping the resonant frequency across the array of cascaded low-Q resonators provides the optical phase modulator with an improved linear response, in terms of phase and transmitted intensity, over a broad range of input voltages.

Further details of various embodiments are described hereafter with reference to the drawings.

FIG. 1 is a schematic illustration of a cascaded resonant optical phase modulator 100, according to one embodiment. The optical phase modulator 100 comprises an array of cascaded optical resonators 110-1, 110-2, ... 110-n, which can be located on a substrate 120. In some embodiments, substrate 120 can be coupled to an integrated photonics chip.

As described further hereafter, each of the optical resonators has an input port and an output port. In one embodiment, each of the optical resonators can include one or more grating structures. In another embodiment, each of the optical resonators can include a ring resonator structure.

In one implementation, each of the optical resonators have the same resonance frequency. In another implementation, each of the optical resonators have a respectively different resonance frequency from the other optical resonators.

A plurality of waveguides 130-1, 130-2, ... 130-n are located on substrate 120, and are configured to provide cascaded optical communication between the optical resonators. Each of the waveguides is respectively coupled between the output port of one resonator and the input port of an adjacent resonator. For example a waveguide 130-1 is coupled between the output port of resonator 110-1 and the input port of adjacent resonator 110-2, a waveguide 130-2 is coupled between the output port of resonator 110-2 and the input port of an adjacent resonator, and so on.

The optical resonators and waveguides of optical phase modulator 100 can be composed of one or more electro-optic materials. Examples of suitable electro-optic materials include lithium niobate, lithium tantalate, barium titanate, rubidium titanyl phosphate, potassium titanyl phosphate, or combinations thereof.

A travelling wave transmission electrode 140 is positioned adjacent to the optical resonators on substrate 120. The transmission electrode 140 is configured to apply a drive voltage across the optical resonators. The transmission electrode 140 includes a first bus bar 142, and an opposing second bus bar 146. The first and second bus bars 142, 146 are located on opposing sides of the array of optical resonators, and each have a plurality of interdigitated electrode fingers. The transmission electrode 140 is connected to a radio frequency (RF) source (RF In) at an input end of bus bar 142, and bus bar 146 is connected to ground.

In particular, the first bus bar 142 includes a first set of electrode fingers 144-1, 144-2, ... 144-n that respectively protrude along one side of each of the optical resonators. The second bus bar 146 includes a second set of electrode fingers 148-1, 148-2, ... 148-n that respectively protrude along an opposite side of each of the optical resonators. For example, electrode finger 144-1 protrudes along one side of resonator 110-1 and electrode finger 148-1 protrudes along an opposite side of resonator 110-1, electrode finger 144-2 protrudes along one side of resonator 110-2 and electrode finger 148-2 protrudes along an opposite side of resonator 110-2, and so on.

The optical phase modulator 100 is operative to co-propagate an input optical wave with the drive voltage, such that a resonator-to-resonator optical delay is matched with a resonator-to-resonator electrical delay. For example, when a drive voltage is applied to the input end of bus bar 142, the voltage will applied to resonator 110-1 simultaneously with the input optical wave entering resonator 110-1, then the drive voltage will be applied to resonator 110-2 simultaneously with the input optical wave entering the resonator 110-2, and so on.

The array of optical resonators in optical phase modulator 100 can be formed as low-Q resonators, with RF and optical velocities matched to each other. The optical resonators can simultaneously achieve low $V_\pi$, (less than about 1 V) and high bandwidth (greater than about 20 GHz) with a small footprint.

Figure 2A:
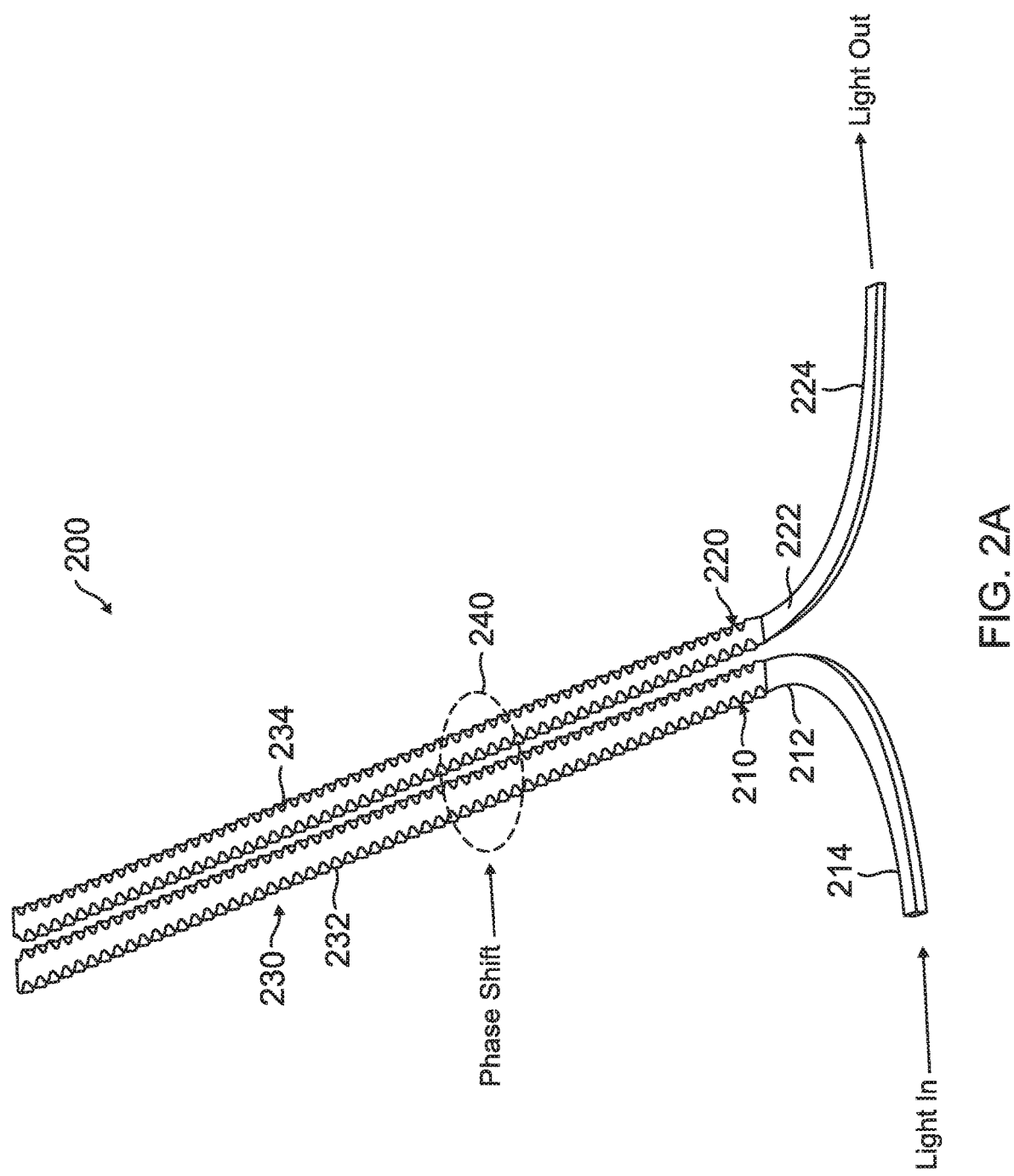
FIG. 2A is an enlarged schematic perspective view of a grating-based optical resonator for an optical phase modulator, according to one embodiment.

FIG. 2A illustrates an exemplary grating-based optical resonator 200, according to one embodiment. The optical resonator 200 can be implemented as part of an array of optical resonators, each having the same structure, in an optical phase modulator such as optical phase modulator 100. Generally, optical resonator 200 is an all-pass filter having a grating structure such as Bragg gratings. In one embodiment, optical resonator 200 can be an unbalanced Bragg resonator.

The optical resonator 200 comprises a waveguide structure including a first waveguide 210 and a second waveguide 220. An input port 212 is located at one end of first waveguide 210, and an output port 222 is located at one end of second waveguide 220 adjacent to input port 212. An input waveguide portion 214 is coupled to input port 212, and an output waveguide portion 224 is coupled to output port 222.

A grating-assisted directional coupler 230 is located along the waveguide structure of first waveguide 210 and second waveguide 220. The grating-assisted directional coupler 230 includes a first periodic grating structure 232 on first waveguide 210, and a second periodic grating structure 234 on second waveguide 220.

The optical resonator 200 is configured to receive light injected from input waveguide portion 214 into input port 212, which directs the light to grating-assisted directional coupler 230. In a phase shift portion 240 of periodic grating structures 232, 234, a pi phase shift in the phase of the modulation employed to create the grating structure generates a tightly confined light field at the resonance wavelength, with the light circulating around the pi phase shift. A pi phase shift is an abrupt change in a spatial pattern of the waveguide modulation, such that a periodic structure of the waveguide modulation is shifted in spatial phase by pi radians on either side of an interface.

Figure 2B:
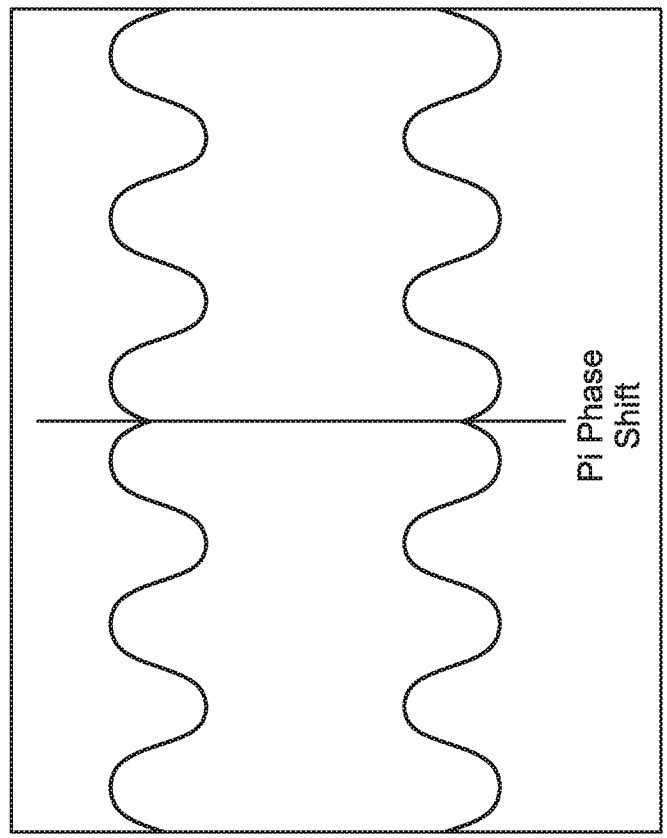
FIG. 2B is an enlarged top view of a pi phase shift design, according to one embodiment, which can be employed in the grating-based optical resonator of FIG. 2A.

One example of a pi phase shift design 250 for phase shift portion 240, is shown in FIG. 2B. The pi phase shift design 250 allows selected wavelengths of light to exit optical resonator 200 through output port 222 to output waveguide portion 224. The resonance wavelength can be modified by changing the period of the grating structure.

FIG. 3 illustrates an exemplary ring-based optical resonator 300, according to an alternative embodiment. The optical resonator 300 can be implemented as part of an array of optical resonators, each having the same structure, in an optical phase modulator. Generally, optical resonator 200 is a ring resonator filter.

The optical resonator 300 comprises a waveguide structure including a ring resonator structure 310 and a bus waveguide 320. An input port 322 is located at one end of bus waveguide 320, and an output port 324 is located at an opposite end of bus waveguide 320. The bus waveguide 320 is optically coupled to ring resonator 310 at a coupling region 314 on one side of the ring resonator 310.

The optical resonator 300 is configured to receive light injected into bus waveguide 320 from input port 322. The light is coupled into ring resonator 310 at coupling region 314 and propagates around ring resonator 310. The ring resonator 310 allows selected wavelengths of the light to be coupled out to bus waveguide 320 at coupling region 314. This light exits out of optical resonator 300 through output port 324.

In one example implementation, an optical phase modulator can have an array of 250 resonators, each with a quality factor (Q factor) of 4700 and corresponding bandwidth of 41.2 GHz. The optical delay per resonator is 0.0038 ns, which is exactly matched to the electrical delay per electrode pair. The bandwidth of the array of resonators can approach the bandwidth of a single resonator. There is an increased latency by adding more resonators. An optical wave front sees the same voltage at each resonator and accumulates a corresponding phase shift.

Figure 4A:
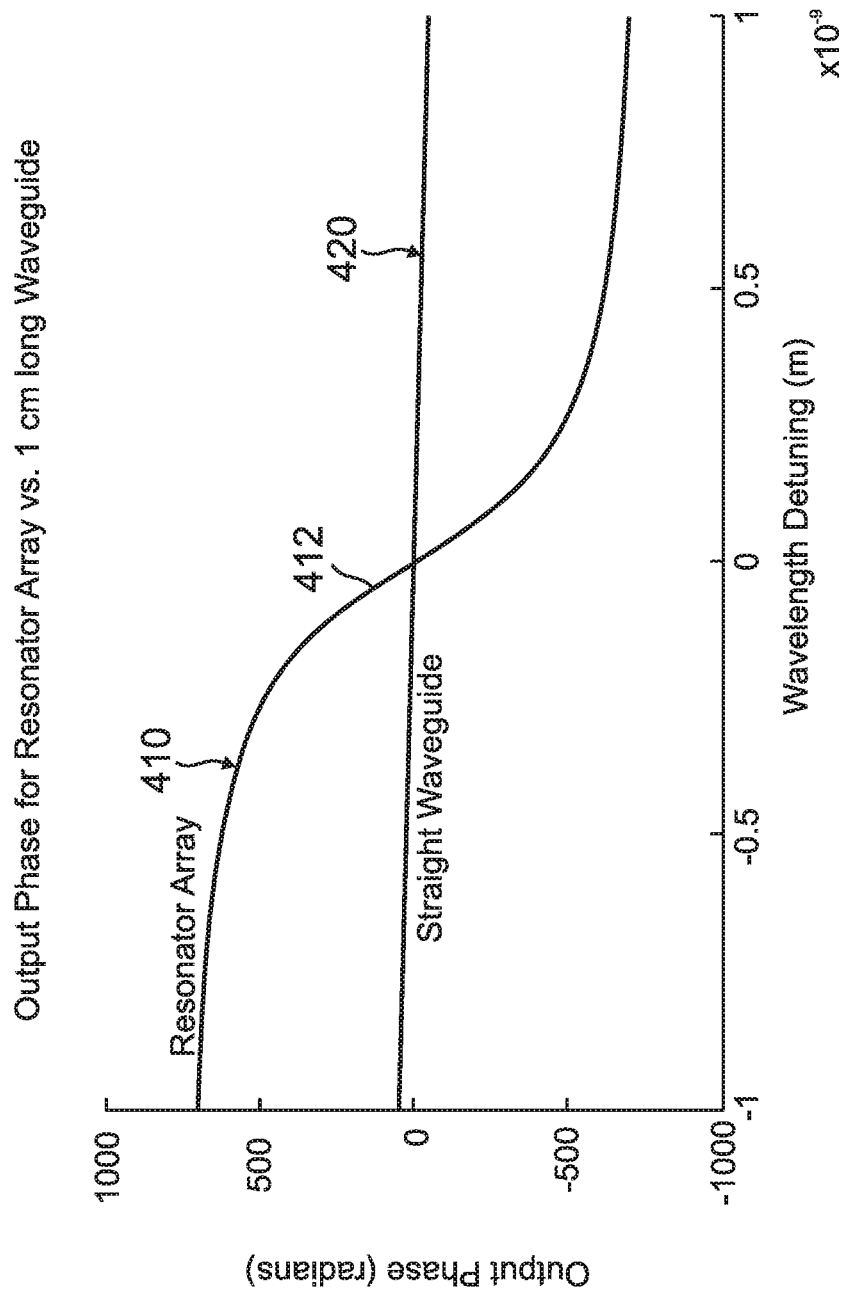
FIG. 4A is a graph of the output phase for a resonator array of 250 resonators compared to a straight waveguide.
Figure 4B:
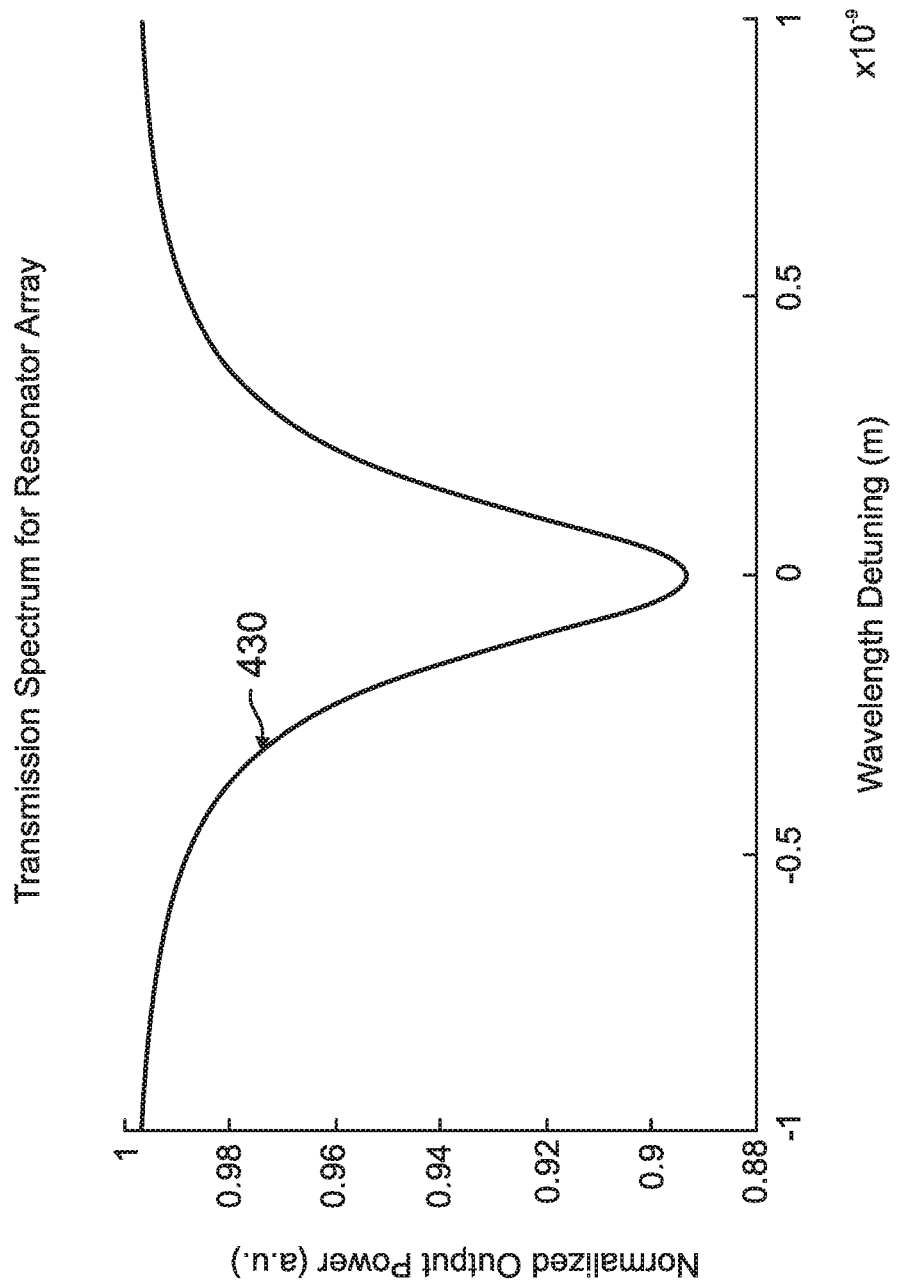
FIG. 4B is a graph of the transmission spectrum for the resonator array of 250 resonators.

FIG. 4A is a graph of the output phase of transmitted light for the resonator array of 250 resonators (each with the same resonance wavelength) compared to a 1 cm long straight waveguide. In particular, the graph of FIG. 4A shows plot lines 410, 420 for the output phase as a function of wavelength detuning. FIG. 4B is a graph of the transmission spectrum for the resonator array of 250 resonators. In particular, the graph of FIG. 4B shows a plot line 430 for the normalized output power as a function of wavelength detuning.

As shown in FIG. 4A, the slope of the output phase with respect to wavelength for the resonator array (plot line 410), which corresponds to the slope of the phase with respect to voltage, is greater than it would be for a straight waveguide (or a single resonator) (plot line 420). Because only very slight modulation is required relative to the resonance FWHM (full width at half maximum) (less than 1 pm vs. 329.7 pm), the response is highly linear, as shown in a central region 412 (region of operation) of plot line 410.

As discussed hereafter, further improvements in linearity may be achieved if necessary by sweeping the optical resonance frequency from one resonator to the next.

Figure 5A:
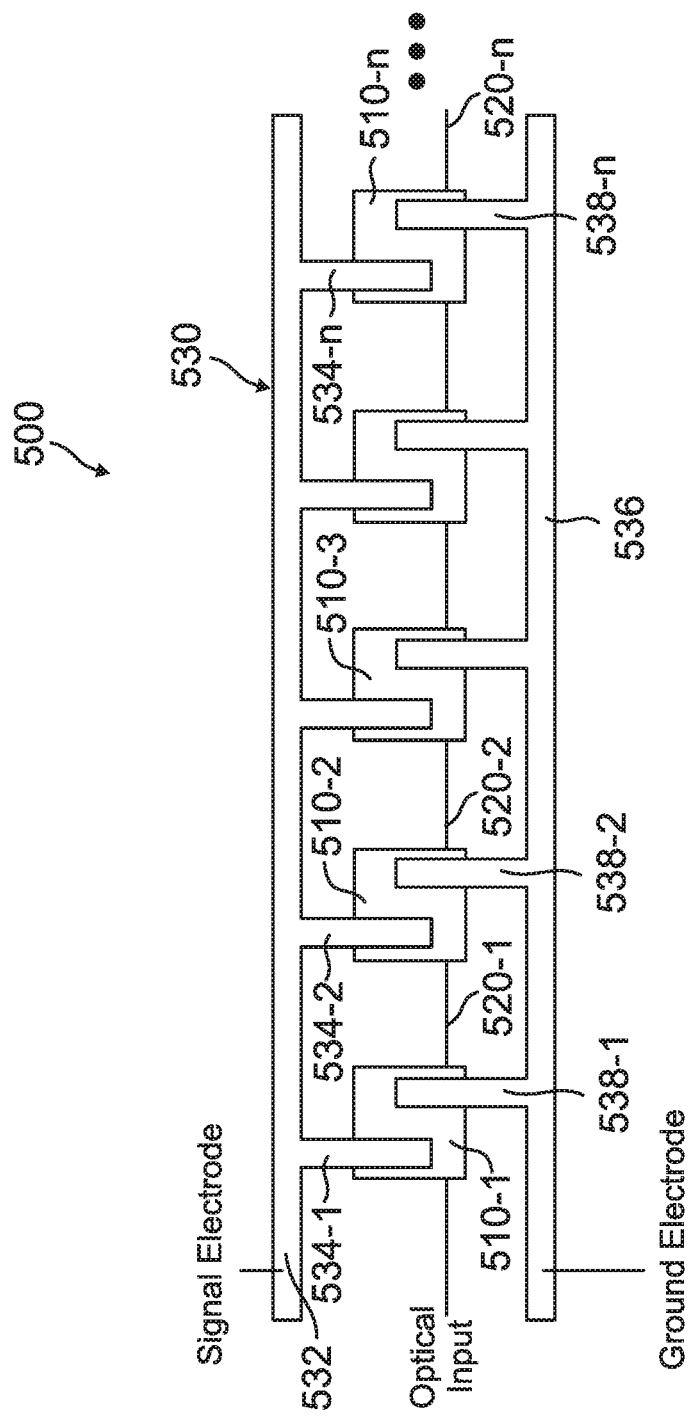
FIG. 5A is a schematic diagram of an optical phase modulator, according to another embodiment.

FIG. 5A is a schematic illustration of a cascaded resonant optical phase modulator 500, according to another embodiment. The optical phase modulator 500 comprises an array of cascaded optical resonators 510-1, 510-2, . . . 510-n, which can be located on a substrate. In some embodiments, the substrate can be coupled to an integrated photonics chip. In one implementation, each of the optical resonators have the same resonance frequency. In another implementation, each of the optical resonators have a respectively different resonance frequency from the other optical resonators.

As described further hereafter, each of the optical resonators has an input port and an output port. In one embodiment, each of the optical resonators is a grating-based optical resonator, such as described previously (FIG. 2A). In another embodiment, each of the optical resonators is a ring-based optical resonator, such as described previously (FIG. 3).

A plurality of waveguides 520-1, 520-2, . . . 520-n are located on the substrate, and are configured to provide cascaded optical communication between the optical resonators. Each of the waveguides is respectively coupled between the output port of one resonator and the input port of the next resonator. For example a waveguide 520-1 is coupled between the output port of resonator 510-1 and the input port of resonator 510-2, a waveguide 520-2 is coupled between the output port of resonator 510-2 and the input port of resonator 510-3, and so on.

In some embodiments, the optical resonators and waveguides of optical phase modulator 500 can be composed of one or more thermo-optic materials. Examples of suitable thermo-optic materials include silicon, silicon nitride, titanium dioxide, lithium niobate, or combinations thereof.

A travelling wave transmission electrode 530 is positioned adjacent to the optical resonators. The transmission electrode 530 is configured to apply a drive voltage across the optical resonators. The transmission electrode 530 includes a signal electrode having a first bus bar 532, and a ground electrode having a second bus bar 536. The first and second bus bars 532, 536 are located on opposing sides of the array of optical resonators, and each have a plurality of interdigitated electrode fingers. The transmission electrode 530 is connected to a RF source at an input end of bus bar 532.

In particular, the first bus bar 532 includes a first set of electrode fingers 534-1, 534-2, . . . 534-n, which respectively protrude over the optical resonators. The second bus bar 536 includes a second set of electrode fingers 538-1, 538-2, . . . 538-n, which also respectively protrude over the optical resonators. In one embodiment, transmission electrode 530 is configured to apply a drive voltage across the optical resonators to heat the resonators The optical phase modulator 500 is operative to co-propagate an input optical wave with the drive voltage, such that a resonator-to-resonator optical delay is matched with a resonator-to-resonator electrical delay. For example, when a drive voltage is applied to the input end of bus bar 532, the voltage will applied to resonator 510-1 simultaneously with the input optical wave entering resonator 510-1, then the drive voltage will be applied to resonator 510-2 simultaneously with the input optical wave entering the resonator 510-2, and so on.

Figure 5B:
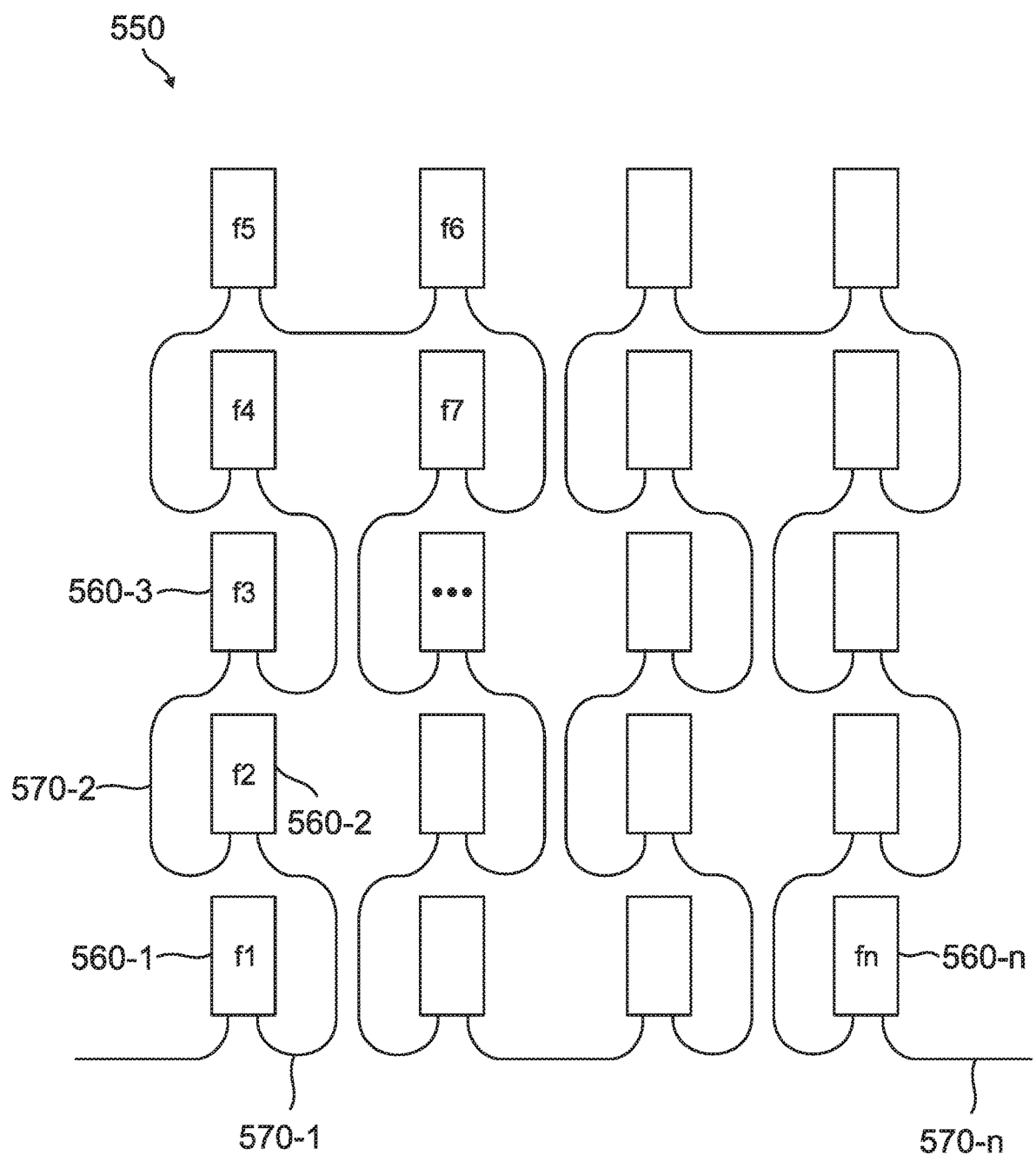
FIG. 5B is a schematic diagram of a portion of an optical phase modulator, according to a further embodiment.

FIG. 5B is a schematic illustration of a portion of an optical phase modulator 550, according to another implementation, which shows an array of cascaded optical resonators 560 and waveguides 570. While not shown, a transmission electrode would still be used in this configuration. As depicted, each of the optical resonators 560-1, 560-2, 560-3, . . . 560-n, has a respectively different resonance frequency f1, f2, f3, . . . fn. The waveguides 570-1, 570-2, . . . 570-n provide cascaded optical communication between the optical resonators, with each of the waveguides respectively coupled between the output port of one resonator and the input port of the next resonator.

During operation, the optical phase modulator 550 can be driven thermally using the thermal optic effect to change the resonance frequency of the resonators. In this implementation, it is not necessary to match a delay time of the voltage from the electrode with a delay time of the input optical wave. The array of cascaded resonators are configured such that the resonance frequency is gradually swept in optical phase modulator 550. This gradual varying of resonance frequencies can be used to modulate the phase of an output wave.

Figure 6A:
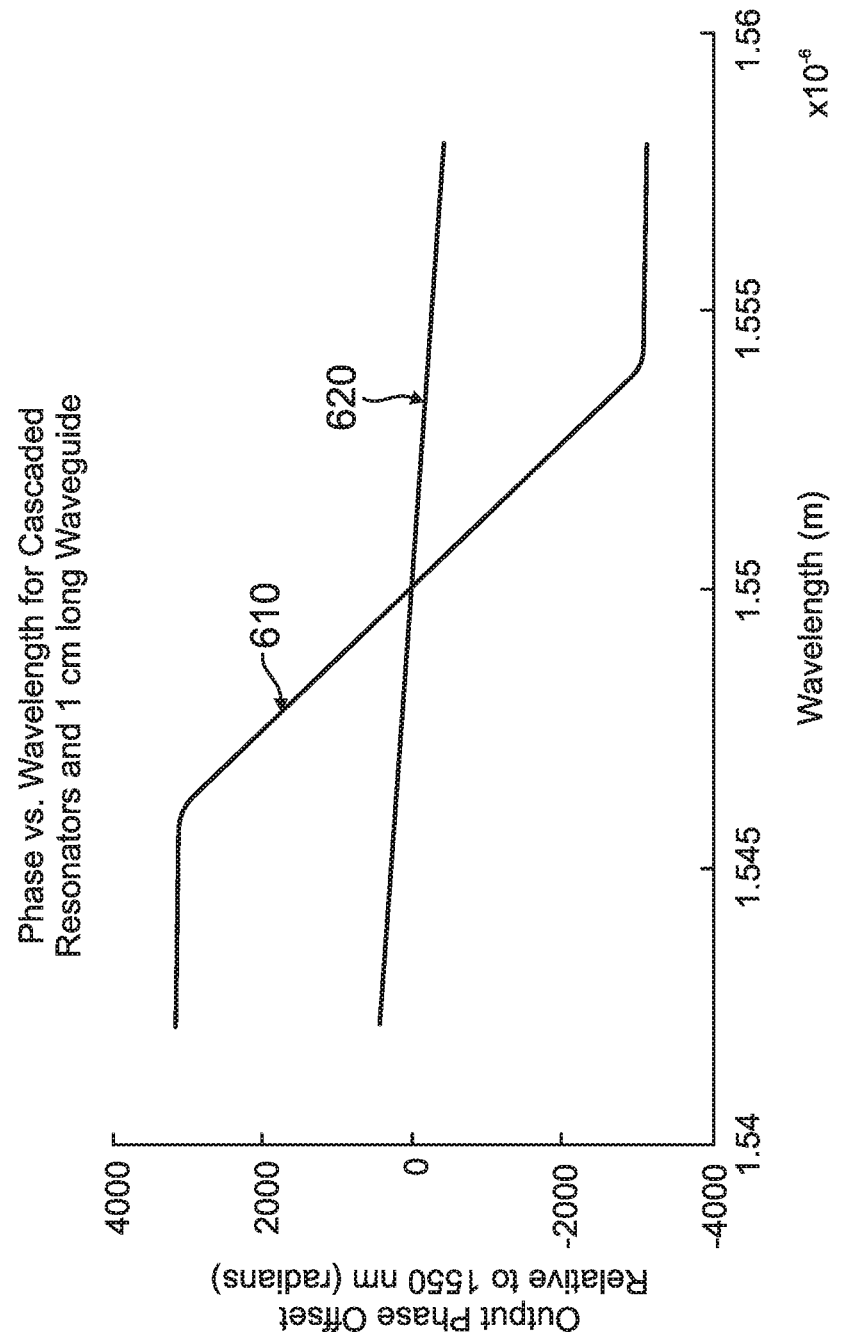
FIG. 6A is a graph of the output phase for a cascaded resonator array compared to a straight waveguide.
Figure 6B:
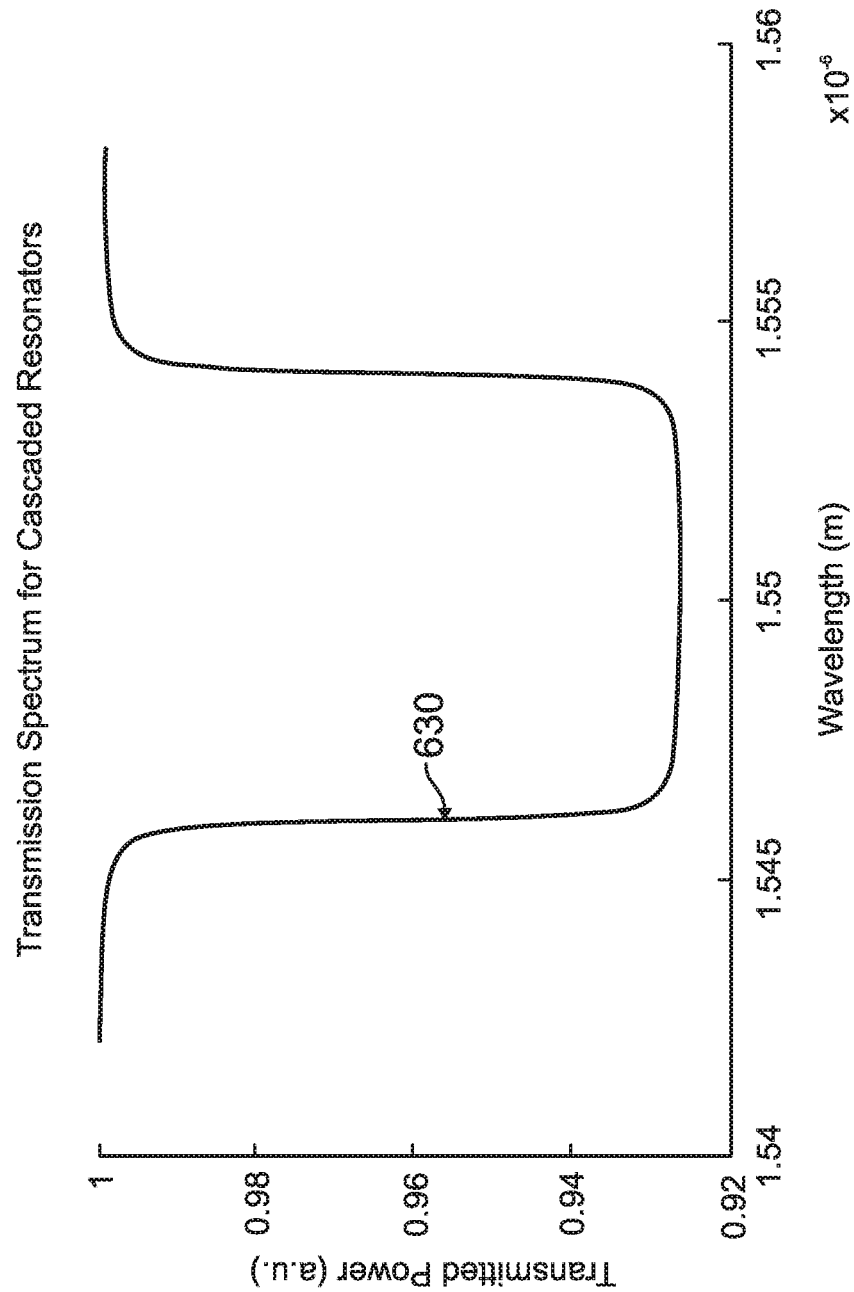
FIG. 6B is a graph of the transmission spectrum for the cascaded resonator array.

FIG. 6A is a graph of the output phase with respect to wavelength for cascaded resonators, such as used in optical phase modulator 550, compared to a 1 cm long straight waveguide. In particular, the graph of FIG. 6A shows plot lines 610, 620 for the output phase offset, relative to 1550 nm, as a function of wavelength. FIG. 6B is a graph of the transmission spectrum for the cascaded resonators. In particular, the graph of FIG. 6B shows a plot line 630 for the transmitted power as a function of wavelength.

As shown in FIG. 6A, the slope of the output phase with respect to wavelength for the cascaded resonators (plot line 610) is greater than it would be for a straight waveguide (plot line 620). This indicates that the cascaded resonators would provide an enhancement in phase sensitivity on the order of about 15 times the sensitivity of the 1 cm long straight waveguide. Although greater enhancement in phase sensitivity is possible, it would be at the cost of increased insertion loss, but this is often acceptable.

Phase Sensitivity and Linearity

Looking more closely at transmission spectra, one can see: (1) the high sensitivity of the phase to applied voltage, (2) the insensitivity of the transmitted power to applied voltage, and (3) the good linearity of the phase response.

Figure 7A:
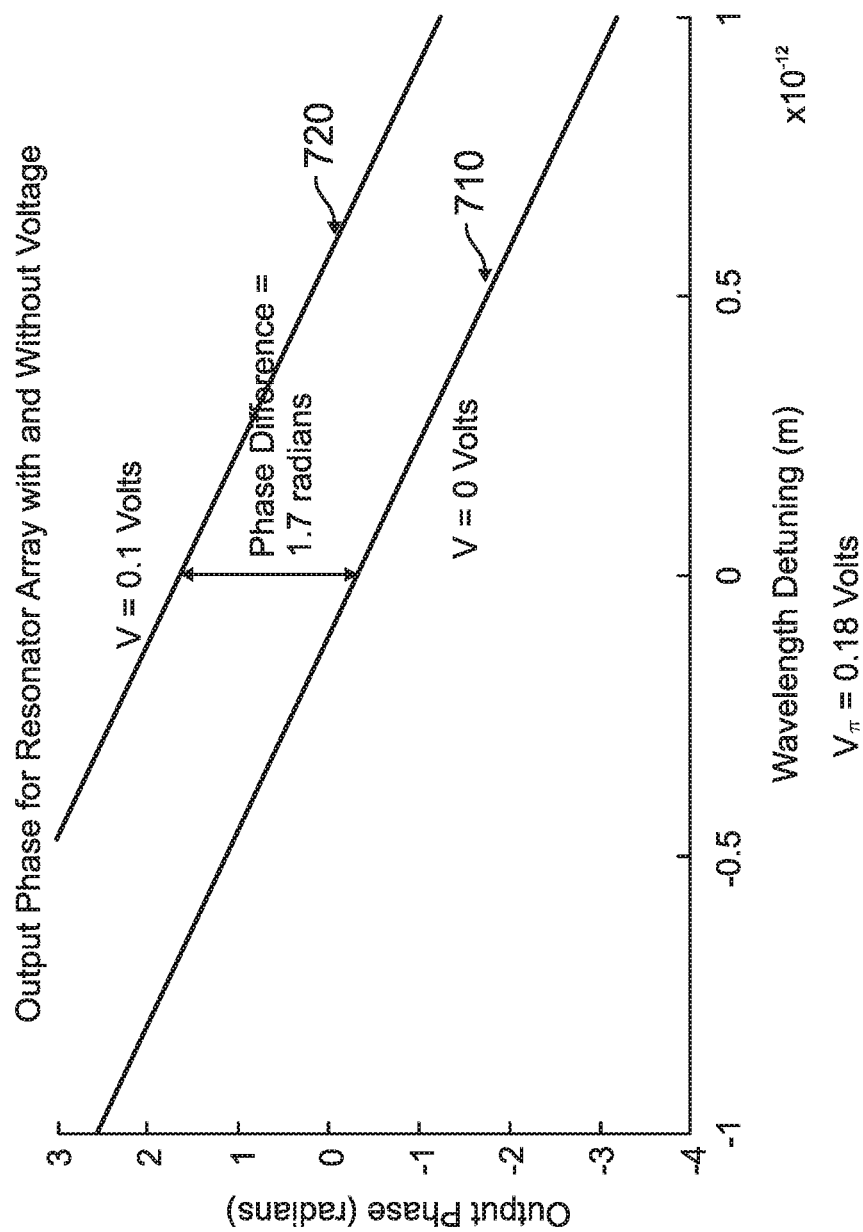
FIG. 7A is a graph of the output phase for a resonator array with and without an applied voltage.

FIG. 7A is a graph of the output phase of transmitted light for a resonator array of 250 resonators (each with the same resonance wavelength) with and without an applied voltage. In particular, the graph of FIG. 7A shows plot lines for the output phase as s function of wavelength detuning, with $V_\pi$=0.18 volts. As shown in FIG. 7A, there is a phase difference of 1.7 radians between the resonator array with 0 volts (plot line 710) and 0.1 volts (plot line 720).

FIG. 7B is a graph of the transmission spectrum for the resonator array with and without the applied voltage. In particular, the graph of FIG. 7B shows plot lines for the normalized output power as function of wavelength detuning. As shown in FIG. 7B, there is a power difference of 1.8 ppm between the resonator array with 0 Volts (plot line 712) and 0.1 Volts (plotline 722).

Improved Linearity

By spreading the resonances across a non-zero wavelength range (0.78 nm, for example), further improvement in linearity can be achieved at the expense of phase sensitivity. In this case, the electrical delay will need to be modified to match the new optical delay.

Figure 8A:
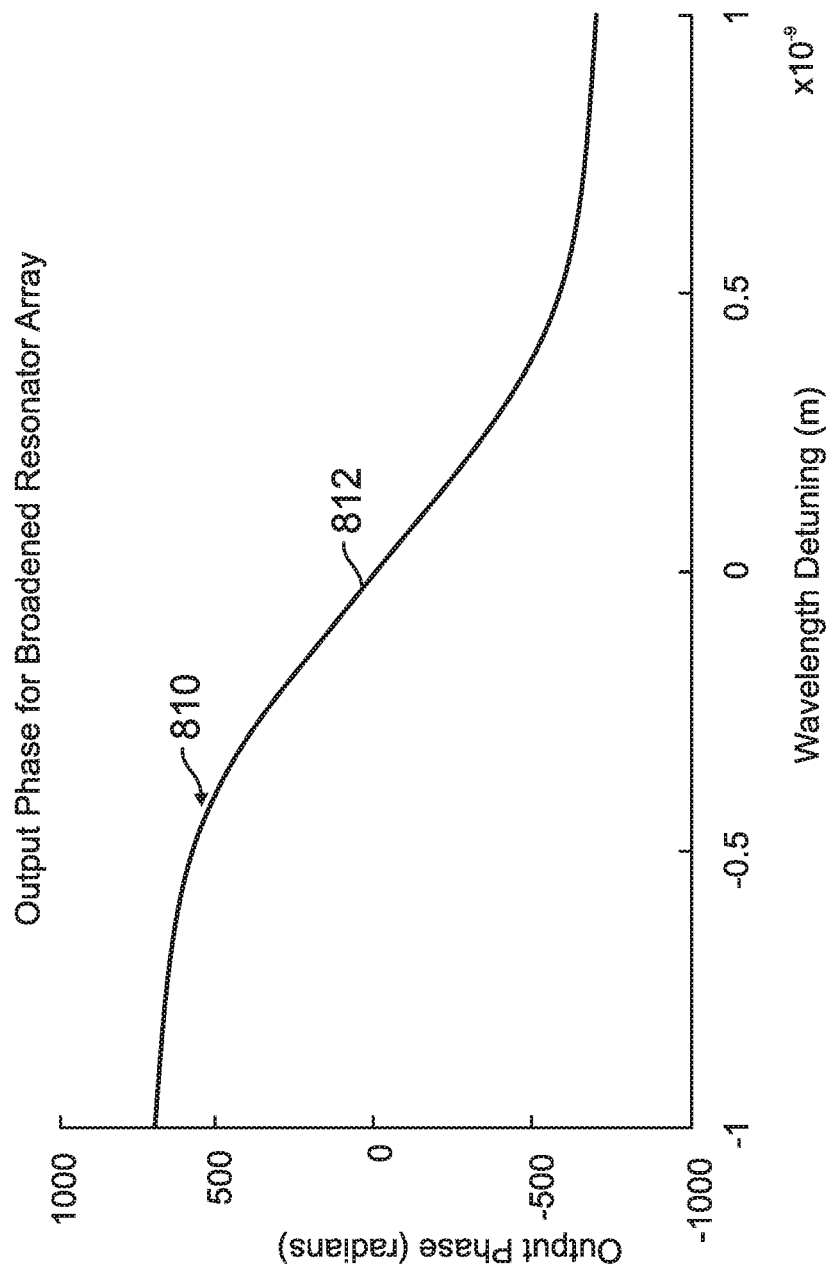
FIG. 8A is a graph of the output phase for a broadened resonator array.

FIG. 8A is a graph of the output phase of transmitted light for a broadened resonator array, in which a resonator array of 250 resonators has a swept resonance wavelength (i.e., each resonator has a different resonance wavelength). In particular, the graph of FIG. 8A shows a plot line 810 for the output phase as a function of wavelength detuning. FIG. 8A shows an improvement in linearity by using resonators with a swept resonance wavelength, as indicated by a central region 812 (region of operation) of plot line 810, compared with central region 412 of plot line 410 (FIG. 4A) for the resonators with the same resonance wavelength.

Figure 8B:
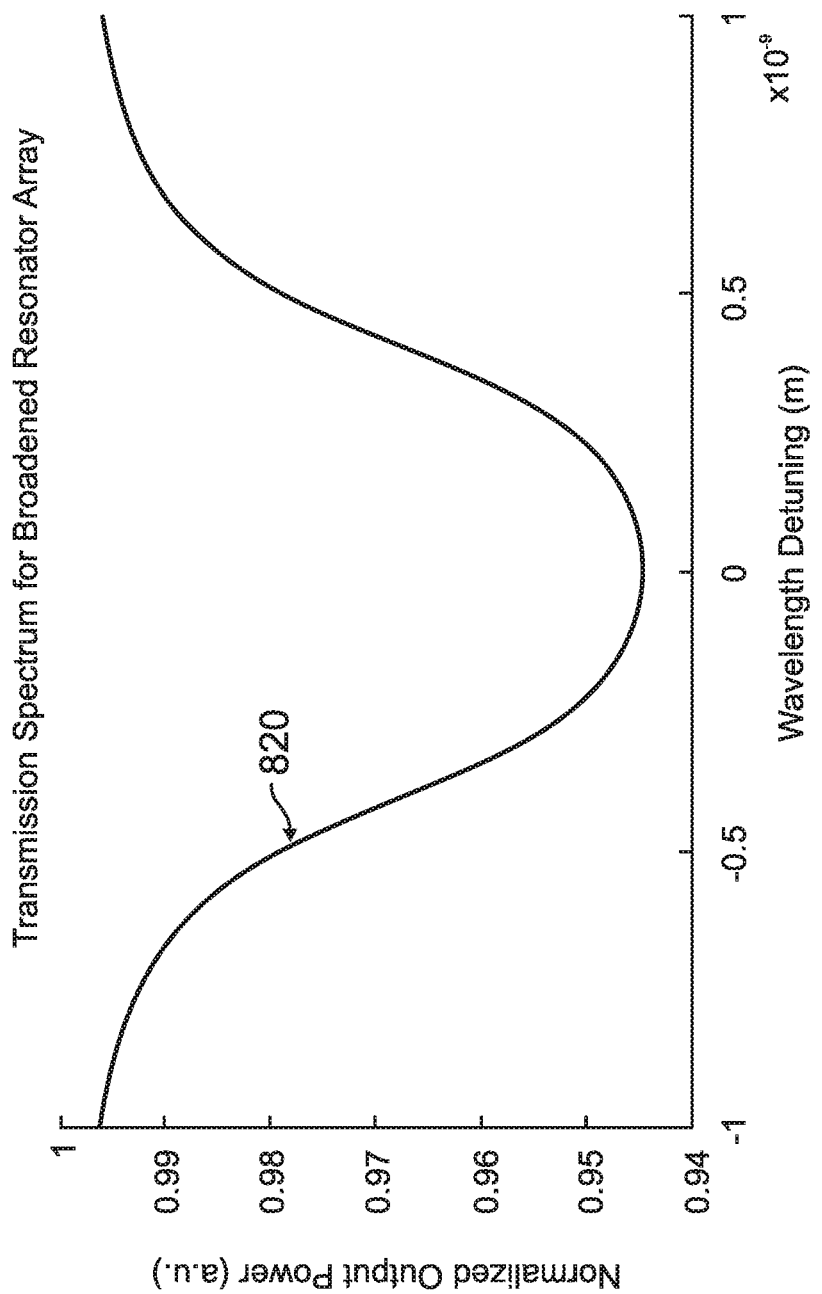
FIG. 8B is a graph of the transmission spectrum for the broadened resonator array.

FIG. 8B is a graph of the transmission spectrum for the broadened resonator array. In particular, the graph of FIG. 8B shows a plot line 820 for the normalized output power as a function of wavelength detuning. In FIG. 8B, plot line 820 shows that there is a significant but acceptable transmission loss associated with the resonance wavelengths of the resonator array.

Figure 8C:
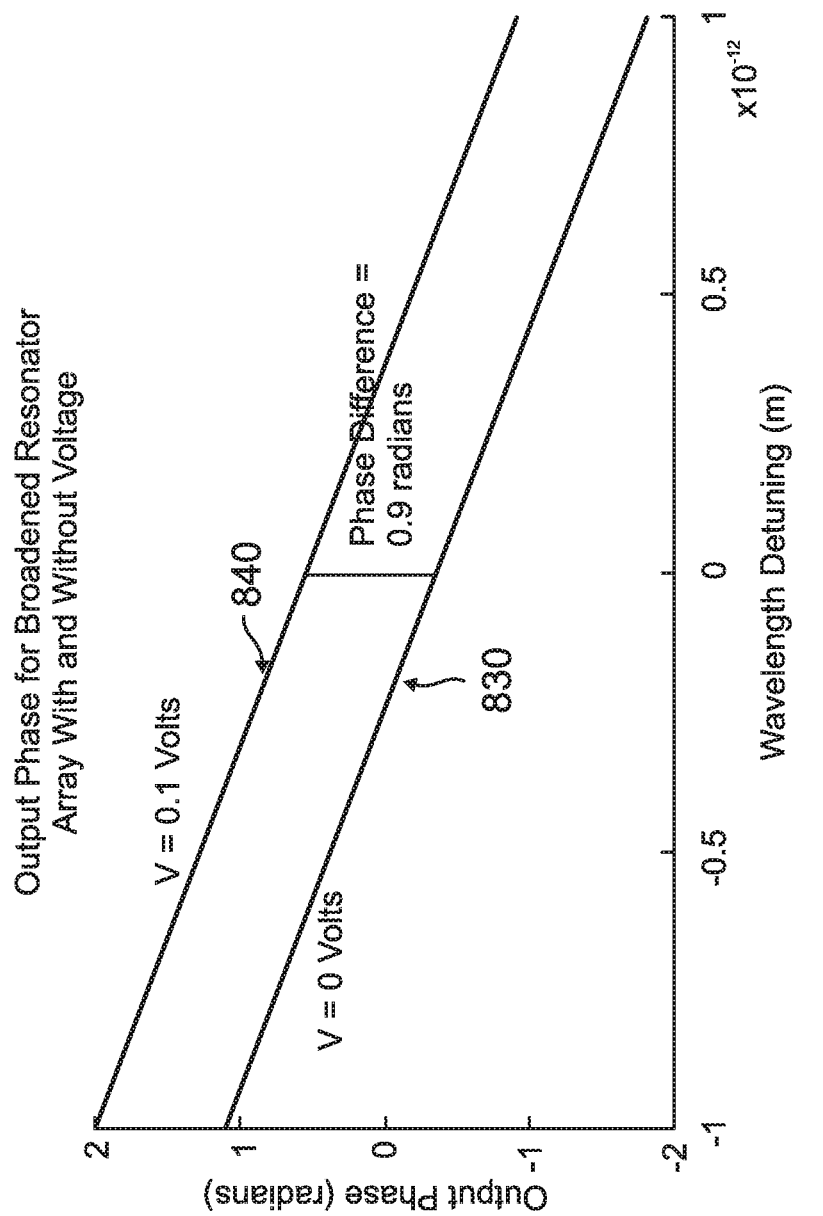
FIG. 8C is a graph of the output phase for the broadened resonator array with and without an applied voltage.

FIG. 8C is a graph of the output phase for the broadened resonator array with and without an applied voltage. In particular, the graph of FIG. 8A shows plot lines for the output phase as a function of wavelength detuning, with $V_\pi$=0.35 Volts. As shown in FIG. 8C, there is a phase difference of 0.9 radians between the resonator array with 0 Volts (plot line 830) and 0.1 Volts (plot line 840).

Figure 8D:
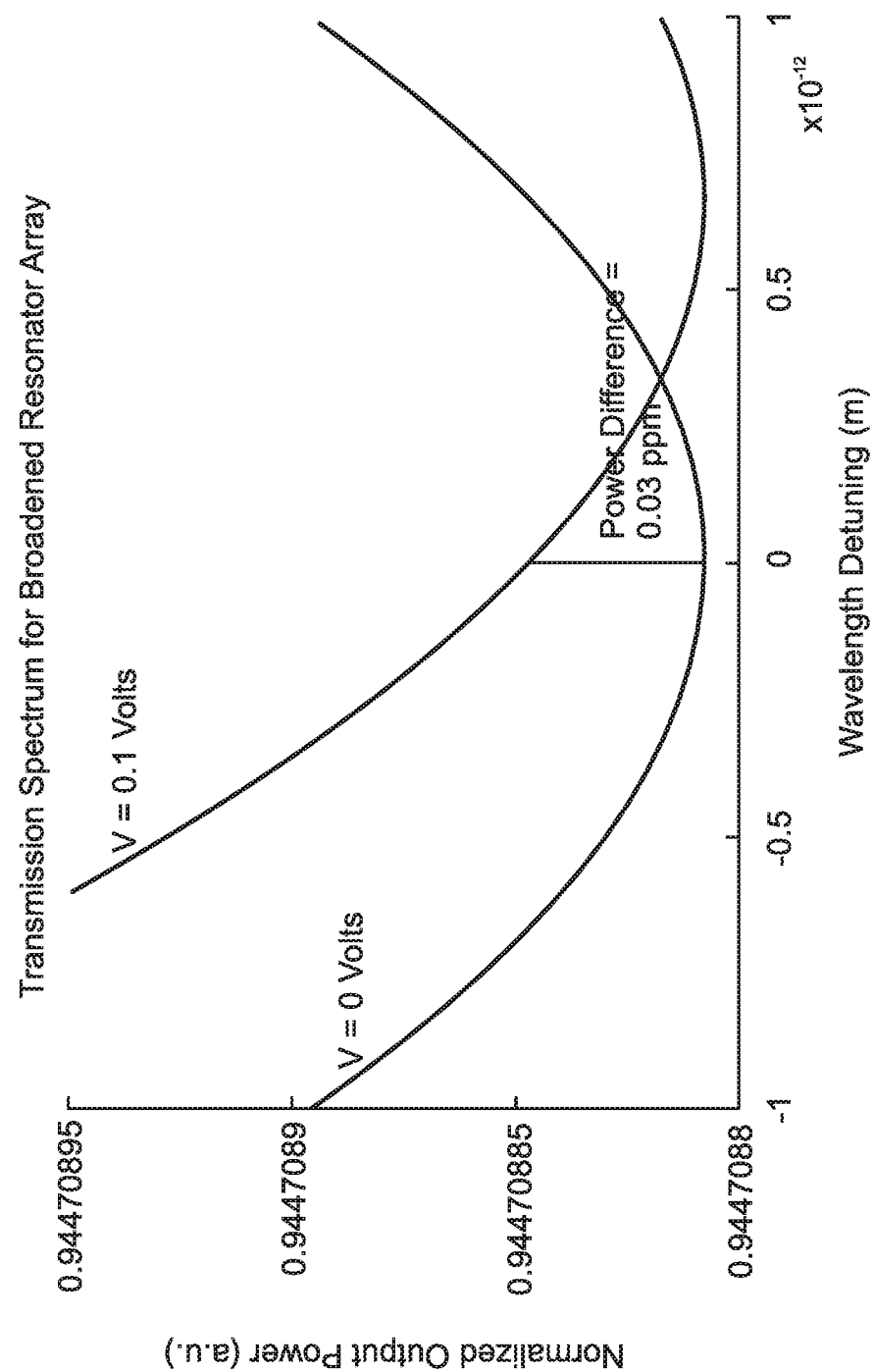
FIG. 8D is a graph of the transmission spectrum for the broadened resonator array with and without the applied voltage.

FIG. 8D is a graph of the transmission spectrum for the broadened resonator array with and without the applied voltage. In particular, the graph of FIG. 8D shows plot lines for the normalized output power as a function of wavelength detuning. As shown in FIG. 8D, there is a power difference of 0.03 ppm between the resonator array with 0 Volts (plot line 832) and 0.1 Volts (plotline 842).

Power Linearity

Figure 9:
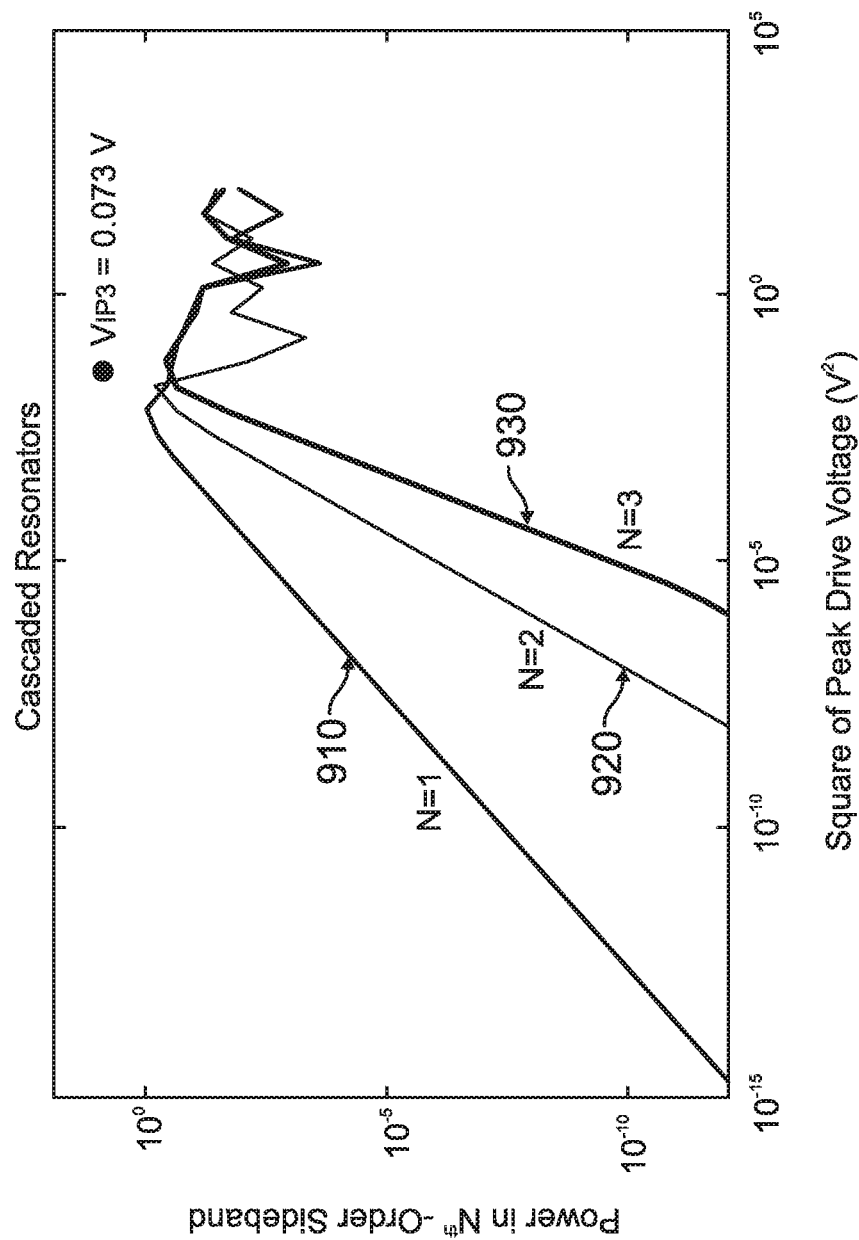
FIG. 9 is a graph showing the power linearity of a cascaded resonator array.

FIG. 9 is a graph showing the power linearity of a resonator array of 250 cascaded resonators. In particular, the graph of FIG. 9 shows plot lines for the power in Nth-order sideband as a function of the square of the peak drive voltage, with the intersection point of the first and third harmonics ($V_{IP3}$)=0.073 V. In FIG. 9, the plot lines 910, 920, and 930 show the power contained in the $1^{st}$-order, $2^{nd}$-order, and $3^{rd}$-order sidebands.

Figure 10:
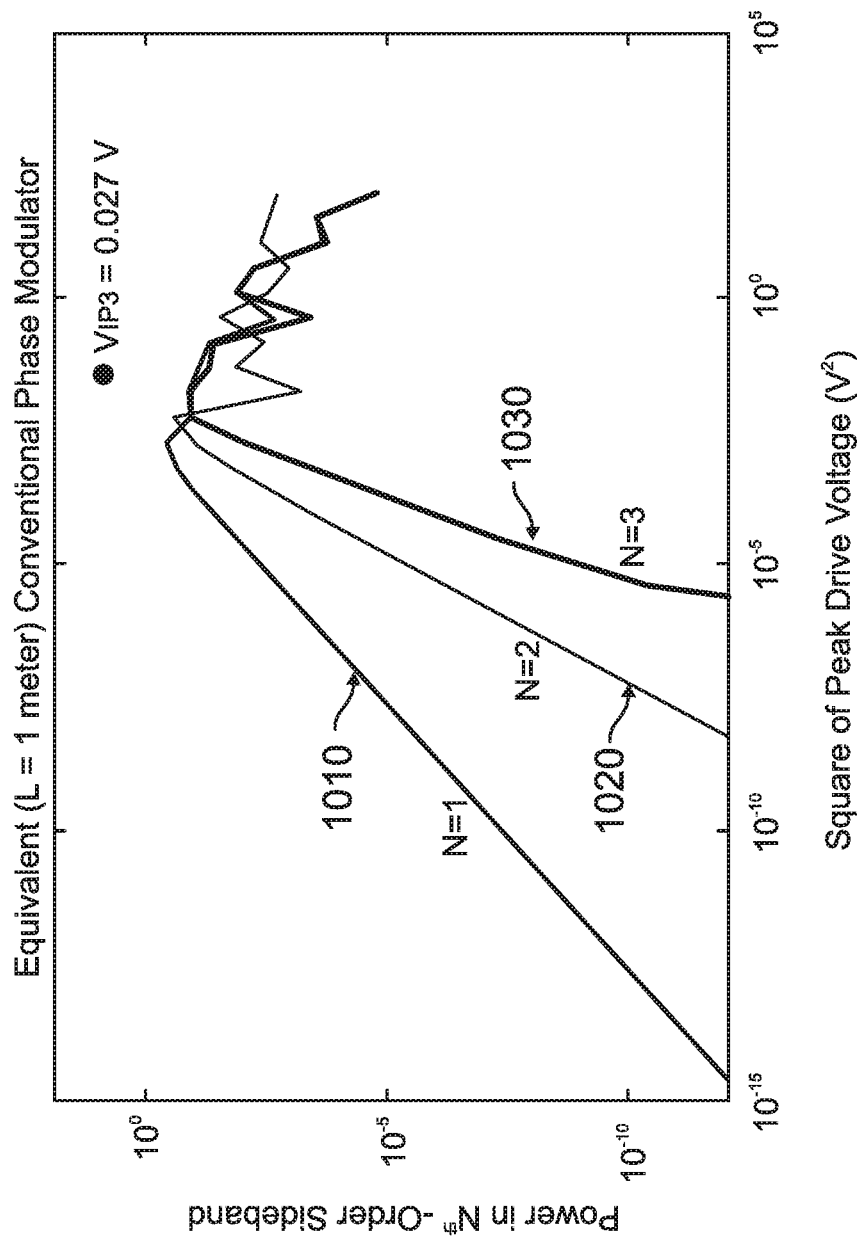
FIG. 10 is a graph showing the power linearity of a conventional phase modulator.

In comparison, FIG. 10 is a graph showing the power linearity of an equivalent (L=1 meter) conventional phase modulator. In particular, the graph of FIG. 10 shows plot lines for the power in Nth-order sideband as a function of the square of the peak voltage, with $V_{IP3}$=0.027 V. In FIG. 10, the plot lines 1010, 1020, and 1030 show to the power contained in the $1^{st}$-order, $2^{nd}$-order, and $3^{rd}$-order sidebands.

The graphs of FIGS. 9 and 10 indicate that a modulator with cascaded resonators will have a power linearity at least as good as that of a straight waveguide based modulator.

Frequency Response

Figure 11:
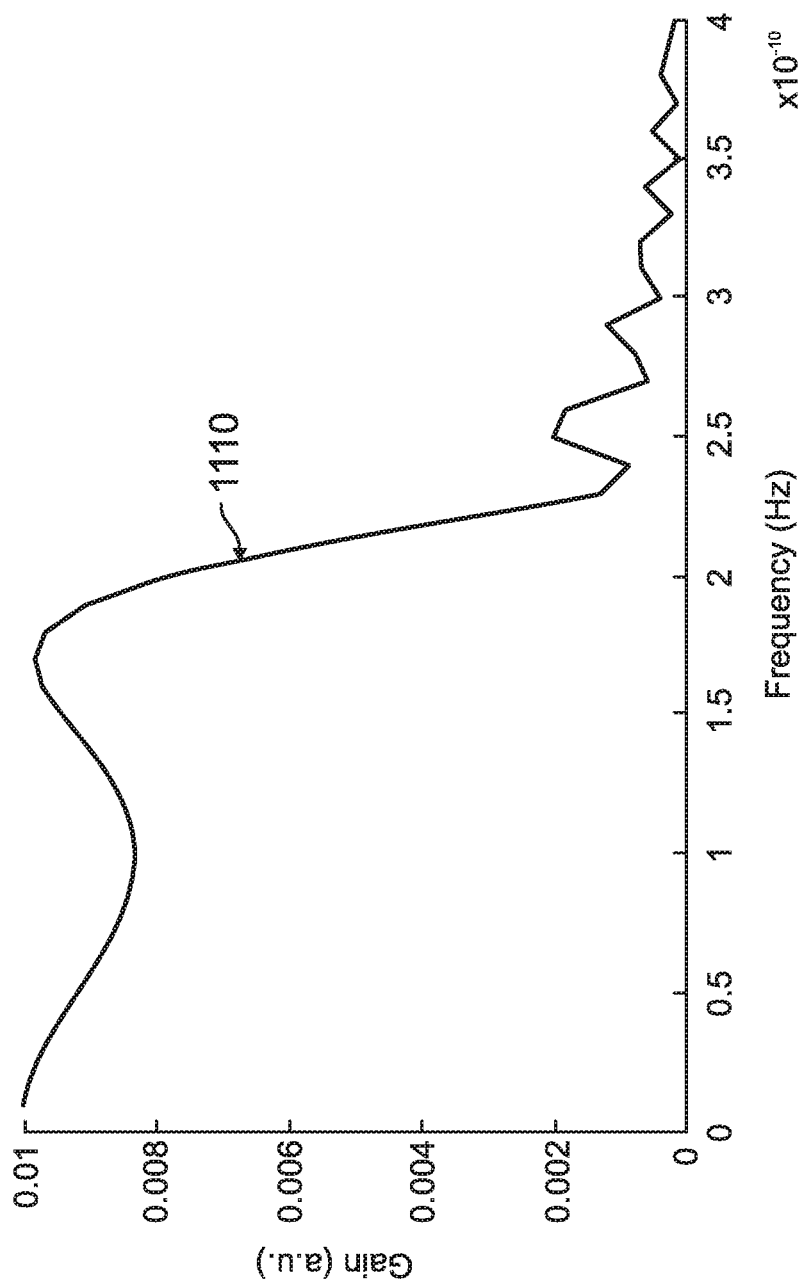
FIG. 11 is a graph of the frequency response of a cascaded resonator array.

FIG. 11 is a graph of the frequency response of a resonator array of 250 cascaded resonators. In particular, the graph of FIG. 11 shows a plot line 1110 for the gain of the cascaded resonators as a function of frequency. In FIG. 11, the plot line 1110 shows that the 3 dB bandwidth of the device is approximately 20 GHz. Time-domain simulations confirm a −3 dB bandwidth of 21 GHz, exceeding a 20 GHz target value for the cascaded resonators.

Example Embodiments

Example 1 includes an optical phase modulator, comprising: a cascaded array of optical resonators, wherein each of the optical resonators has an input port and an output port; a plurality of waveguides coupled between the optical resonators and configured to provide cascaded optical communication between the optical resonators, wherein each of the waveguides is respectively coupled between the output port of one optical resonator and the input port of an adjacent optical resonator; and a transmission electrode positioned adjacent to the optical resonators, the transmission electrode configured to apply a drive voltage across the optical resonators; wherein the optical phase modulator is operative to co-propagate an input optical wave with the drive voltage, such that a resonator-to-resonator optical delay is matched with a resonator-to-resonator electrical delay.

Example 2 includes the optical phase modulator of Example 1, wherein each of the optical resonators have the same resonance frequency.

Example 3 includes the optical phase modulator of Example 1, wherein each of the optical resonators has a respectively different resonance frequency from the other optical resonators Example 4 includes the optical phase modulator of any of Examples 1-3, wherein the optical resonators each comprise one or more grating structures.

Example 5 includes the optical phase modulator of any of Examples 1-3, wherein the optical resonators each comprise a ring resonator.

Example 6 includes the optical phase modulator of any of Examples 1-3, wherein the optical resonators each comprise: a waveguide structure including a first waveguide and a second waveguide, the waveguide structure comprising: the input port, which is located at one end of the first waveguide; the output port, which is located at one end of the second waveguide and adjacent to the input port; and a grating-assisted directional coupler located along the waveguide structure, the grating-assisted directional coupler including a periodic grating structure on each of the first and second waveguides.

Example 7 includes the optical phase modulator of any of Examples 1-6, wherein: the transmission electrode comprises a traveling wave electrode and includes a first bus bar and an opposing second bus bar, the first and second bus bars including a plurality of interdigitated electrode fingers; and optical delay between the optical resonators is matched to electrical delay between elements in the travelling wave electrode.

Example 8 includes the optical phase modulator of Example 7, wherein the first bus bar includes a first set of electrode fingers that protrude along one side of each of the optical resonators, and the second bus bar includes a second set of electrode fingers that protrude along an opposite side of each of the optical resonators.

Example 9 includes the optical phase modulator of any of Examples 7-8, wherein the first bust bar is connected to a radio frequency (RF) source, and the second bus bar is connected to ground.

Example 10 includes the optical phase modulator of any of Examples 1-9, wherein the optical resonators are low-Q resonators and comprise an electro-optic material.

Example 11 includes the optical phase modulator of any of Examples 1-10, wherein an RF velocity in the optical resonators matches a velocity of the optical wave in the optical resonators.

Example 12 includes the optical phase modulator of any of Examples 1-11, wherein the optical resonators, the waveguides, and the transmission electrode are coupled to a substrate.

Example 13 includes the optical phase modulator of Example 12, wherein the substrate is coupled to an integrated photonics chip.

Example 14 includes an optical phase modulator, comprising: a cascaded array of optical resonators, wherein each of the optical resonators has an input port and an output port; a plurality of waveguides coupled between the optical resonators and configured to provide cascaded optical communication between the optical resonators, wherein each of the waveguides is respectively coupled between the output port of one optical resonator and the input port of an adjacent optical resonator; and one or more electrodes adjacent to the optical resonators, wherein the one or more electrodes are configured to apply a voltage across the optical resonators; wherein the optical resonators each comprise one or more grating structures.

Example 15 includes the optical phase modulator of Example 14, wherein each of the optical resonators have the same resonance frequency.

Example 16 includes the optical phase modulator of Example 14, wherein each of the optical resonators has a respectively different resonance frequency from the other optical resonators.

Example 17 includes the optical phase modulator of any of Examples 14-16, wherein the one or more grating structures comprise Bragg gratings.

Example 18 includes the optical phase modulator of any of Examples 14-17, wherein the optical resonators comprise an electro-optic material.

Example 19 includes the optical phase modulator of any of Examples 14-17, wherein the optical resonators comprise a thermo-optic material.

Example 20 includes the optical phase modulator of any of Examples 14-19, wherein the optical resonators are low-Q resonators.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An optical phase modulator, comprising:
a cascaded array of optical resonators, wherein each of the optical resonators has an input port and an output port;
a plurality of waveguides coupled between the optical resonators and configured to provide cascaded optical communication between the optical resonators, wherein each of the waveguides is respectively coupled between the output port of one optical resonator and the input port of an adjacent optical resonator; and
a transmission electrode positioned adjacent to the optical resonators, the transmission electrode configured to apply a drive voltage across the optical resonators;
wherein the optical phase modulator is operative to co-propagate an input optical wave with the drive voltage, such that a resonator-to-resonator optical delay is matched with a resonator-to-resonator electrical delay; wherein:
the transmission electrode comprises a traveling wave electrode and includes a first bus bar and an opposing second bus bar, the first and second bus bars including a plurality of interdigitated electrode fingers; and
optical delay between the optical resonators is matched to electrical delay between elements in the travelling wave electrode.

2. The optical phase modulator of claim 1, wherein each of the optical resonators have the same resonance frequency.

3. The optical phase modulator of claim 1, wherein each of the optical resonators has a respectively different resonance frequency from the other optical resonators.

4. The optical phase modulator of claim 1, wherein the optical resonators each comprise one or more grating structures.

5. The optical phase modulator of claim 1, wherein the optical resonators each comprise a ring resonator.

6. The optical phase modulator of claim 1, wherein the optical resonators each comprise:
a waveguide structure including a first waveguide and a second waveguide, the waveguide structure comprising:
the input port, which is located at one end of the first waveguide;
the output port, which is located at one end of the second waveguide and adjacent to the input port; and
a grating-assisted directional coupler located along the waveguide structure, the grating-assisted directional coupler including a periodic grating structure on each of the first and second waveguides.

7. The optical phase modulator of claim 1, wherein the first bus bar includes a first set of electrode fingers that protrude along one side of each of the optical resonators, and the second bus bar includes a second set of electrode fingers that protrude along an opposite side of each of the optical resonators.

8. The optical phase modulator of claim 1, wherein the first bust bar is connected to a radio frequency (RF) source, and the second bus bar is connected to ground.

9. The optical phase modulator of claim 1, wherein the optical resonators comprise an electro-optic material.

10. The optical phase modulator of claim 1, wherein an RF velocity in the optical resonators matches a velocity of the optical wave in the optical resonators.

11. The optical phase modulator of claim 1, wherein the optical resonators, the waveguides, and the transmission electrode are coupled to a substrate.

12. The optical phase modulator of claim 11, wherein the substrate is coupled to an integrated photonics chip.

13. An optical phase modulator, comprising:
a cascaded array of optical resonators, wherein each of the optical resonators has an input port and an output port;
a plurality of waveguides coupled between the optical resonators and configured to provide cascaded optical communication between the optical resonators, wherein each of the waveguides is respectively coupled between the output port of one optical resonator and the input port of an adjacent optical resonator; and
one or more electrodes adjacent to the optical resonators, wherein the one or more electrodes are configured to apply a voltage across the optical resonators;
wherein the optical resonators each comprise one or more grating structures;
wherein an RF velocity in the optical resonators matches a velocity of an optical wave in the optical resonators.

14. The optical phase modulator of claim 13, wherein each of the optical resonators have the same resonance frequency.

15. The optical phase modulator of claim 13, wherein each of the optical resonators has a respectively different resonance frequency from the other optical resonators.

16. The optical phase modulator of claim 13, wherein the one or more grating structures comprise Bragg gratings.

17. The optical phase modulator of claim 13, wherein the optical resonators comprise an electro-optic material.

18. The optical phase modulator of claim 13, wherein the optical resonators comprise a thermo-optic material.

19. An optical phase modulator, comprising:
a cascaded array of optical resonators, wherein each of the optical resonators has an input port and an output port;
a plurality of waveguides coupled between the optical resonators and configured to provide cascaded optical communication between the optical resonators, wherein each of the waveguides is respectively coupled between the output port of one optical resonator and the input port of an adjacent optical resonator; and
a transmission electrode positioned adjacent to the optical resonators, the transmission electrode configured to apply a drive voltage across the optical resonators;
wherein the optical phase modulator is operative to co-propagate an input optical wave with the drive voltage, such that a resonator-to-resonator optical delay is matched with a resonator-to-resonator electrical delay;
wherein an RF velocity in the optical resonators matches a velocity of the optical wave in the optical resonators.

20. The optical phase modulator of claim 19, wherein the optical resonators, the waveguides, and the transmission electrode are coupled to a substrate, and the substrate is coupled to an integrated photonics chip.

* * * * *